US009266299B2

(12) United States Patent
Brivio et al.

(10) Patent No.: US 9,266,299 B2
(45) Date of Patent: Feb. 23, 2016

(54) ASSEMBLY OF HORIZONTAL SURFACES IN A PLANT FOR PRODUCTION OF CORRUGATED BOARD

(71) Applicant: ITALDRY S.R.L., Briosco (Monza Brianza) (IT)

(72) Inventors: Giuseppe Brivio, Besana Brianza (IT); Renato Rossi, Biassono (IT)

(73) Assignee: ITALDRY S.R.L., Briosco (Monza Brianza) (IT)

( * ) Notice: Subject to any disclaimer, the term of this patent is extended or adjusted under 35 U.S.C. 154(b) by 327 days.

(21) Appl. No.: 13/780,649

(22) Filed: Feb. 28, 2013

(65) Prior Publication Data

US 2013/0228286 A1 Sep. 5, 2013

(30) Foreign Application Priority Data

Mar. 2, 2012 (IT) .............................. MI2012A0325

(51) Int. Cl.
*B32B 37/00* (2006.01)
*B31D 1/00* (2006.01)
*B31F 1/28* (2006.01)

(52) U.S. Cl.
CPC .............. *B31D 1/0075* (2013.01); *B31F 1/285* (2013.01); *B31F 1/2881* (2013.01)

(58) Field of Classification Search
CPC ...... B31F 1/2813; B31F 1/285; B31F 1/2881; B31D 1/0075
USPC ................. 156/205, 210, 470, 499, 555, 582, 156/583.1
See application file for complete search history.

(56) References Cited

U.S. PATENT DOCUMENTS

| | | | | |
|---|---|---|---|---|
| 5,071,507 | A * | 12/1991 | Birke | 156/470 |
| 5,244,518 | A * | 9/1993 | Krayenhagen et al. | 156/64 |
| 6,126,771 | A | 10/2000 | Mosburger et al. | |
| 6,129,654 | A | 10/2000 | Mosburger et al. | |
| 6,257,296 | B1 * | 7/2001 | Pallas et al. | 156/470 |

FOREIGN PATENT DOCUMENTS

EP 1 980 389 A1 10/2008

OTHER PUBLICATIONS

The Search Report and Written Opinion for corresponding Italian Patent Application No. MI2012A000325; eight pages; completed on Oct. 24, 2012.
European Search Report dated Oct. 22, 2015, of the correspondent European Patent application 13157355.

* cited by examiner

*Primary Examiner* — James Sells
(74) *Attorney, Agent, or Firm* — Volpe and Koenig, P.C.

(57) ABSTRACT

Provided is an assembly of horizontal surfaces (1) in a plant for production of corrugated board including at least one gluing station (10) suitable to carry out union between at least two sheets (1*a*, 1*b*) of paper material; said gluing station (10) including a preheating block (30) suitable to heat said at least two sheets(1*a*, 1*b*); a union block (40) suitable to complete union of said at least two sheets (1*a*, 1*b*); and the preheating block (30) including a first actuating system (32) suitable for moving the sheets (1*a*, 1*b*) and including a first actuation belt (32*a*) suitable to come into contact with one of the sheets (1*a*, 1*b*) and suitable to be moved in correspondence with the preheating block (30).

9 Claims, 1 Drawing Sheet

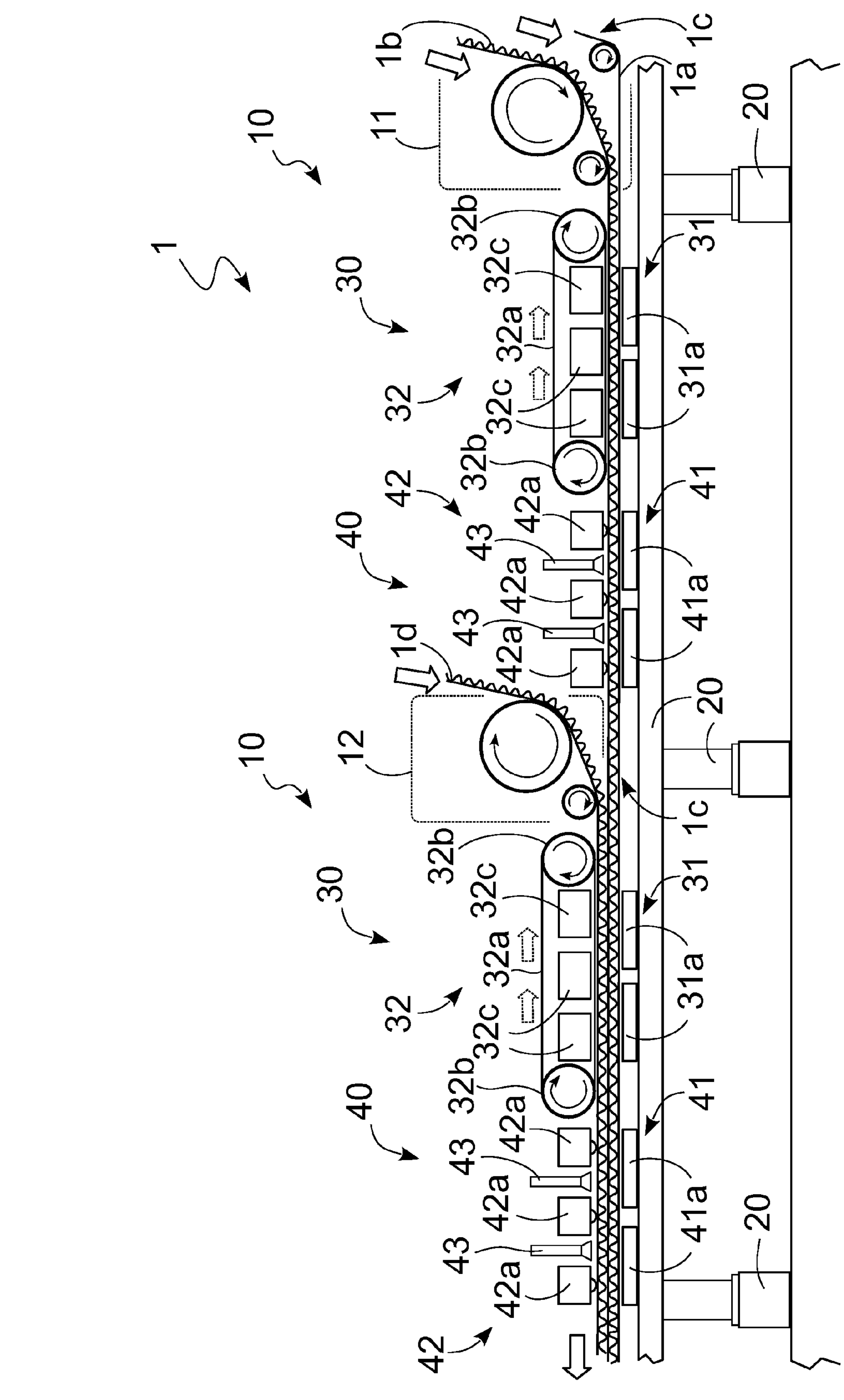
1
1a
1b
1c
1d
10
11
12
20
30
31
31a
32
32a
32b
32c
40
41
41a
42
42a
43

ASSEMBLY OF HORIZONTAL SURFACES IN A PLANT FOR PRODUCTION OF CORRUGATED BOARD

The present invention relates to an assembly of horizontal surfaces in a plant for production of corrugated board of the type as recited in the preamble of claim 1.

In particular, the invention relates to a portion of a machine suitable for performing gluing of two or more sheets of paper material. More in particular, the assembly of horizontal surfaces can be used in a corrugated board production plant for gluing a cover to one or more corrugated paper pieces, that is a sheet of corrugated paper previously glued to a cover.

As is known, the assembly of horizontal surfaces usually consists of two main parts: a part, called the hot section, suitable to heat the parts to be glued so as to achieve the gluing; and a part, called the cold section, suitable to move the corrugated board and to keep the glued parts touching each other.

The hot section is formed of a support frame and of several metal plates, made so as to guarantee stability, smoothness and an even transfer of heat all over the contact surface to permit uniform gluing.

In order to achieve a homogeneous heating of the metallic plates, each of them bears, on the inside, a serpentine of channels specially designed to permit a continuous and optimal fluidity of the steam eliminating the possibility of internal condensation, thereby succeeding in obtaining an evenly heated external surface, essential for the correct formation of the board. In particular, such plates have an external temperature varying from 120° to 180° C. depending on the type of board being produced and on the action performed by the plates.

The hot section presents, depending on the direction of advancement, two or more groups of plates having a variable temperature depending on the action performed and on the temperature required. In detail, the plates can be sub-divided into a heating subset suitable to heat the sheets to be glued so as to improve the joining capacity of the glue used; and a drying subset suitable to vaporise the excess water so as to have the correct humidity value of the corrugated board.

Lastly, the hot section may present a third group of plates fitted with special nozzles making it possible to regulate the humidity content so as to avoid warping or other undesirable deformations of the corrugated board.

The upper part of the hot section performs the drawing of the corrugated board and the correct pressure of the various corrugated paper pieces on the cover. It is therefore composed of a belt guided by an idler roll situated at the start and a driving drum situated at the end of the assembly of horizontal surfaces.

In order to ensure adequate pressure and thus correct gluing, the force exerted on the belt may be regulated by small pressure rollers suitable to press said belt against the corrugated paper piece that is against the assembly composed of a corrugated paper piece and a cover.

The prior art described above has several significant drawbacks.

A first significant drawback is represented by the fact that the belt of the assembly of horizontal surfaces in a plant for production of corrugated board tends to assume practically constant physical-chemical conditions (humidity, temperature) along its entire extension.

Such condition means that the sheet of corrugated board tends to warp, that is to assume a curved shape determining an incorrect formation of the corrugated board such as to sometimes determine the need to interrupt production.

Another drawback due to incorrect heating is the formation of bubbles that is of intermittent gluing, determined by an excessive heating since the heat source is situated only on one side in the lower part of the hot section.

Such incorrect heating is particularly evident in the case in which a corrugated board is to be made with several flutes and formed of several corrugated paper pieces which therefore require a greater quantity of heat to reach the right temperature for gluing on account of the greater thickness.

In fact, to adequately heat the elements furthest from the heated plates and thus permit correct gluing thereof, such elements need to reach the right temperature for such gluing before the end of the assembly of horizontal surfaces.

To such purpose, the plates of the heating assembly must provide a large quantity of heat which in some cases may cause deterioration of the elements adjacent thereto.

In this situation the technical purpose of the present invention is to develop an assembly of horizontal surfaces in a plant for production of corrugated board able to substantially overcome the inconveniences mentioned above.

Within the sphere of said technical purpose, an important aim of the invention is to make an assembly of horizontal surfaces in a plant for production of corrugated board which permits optimal conditions during the heating, drying and humidity regulation steps of said assembly of horizontal surfaces to be achieved.

Another important aim of the invention is to permit the production of a corrugated board substantially free of defects.

Another important aim of the invention is to permit the production of an assembly of horizontal surfaces which permits a practically ideal gluing of the cover to the various flutes to be performed.

The technical purpose and specified aims are achieved with an assembly of horizontal surfaces in a plant for production of corrugated board as claimed in the appended claim 1.

Preferred embodiments are described in the dependent claims.

The characteristics and advantages of the invention are clearly evident from the following detailed description of a preferred embodiment thereof, with reference to FIG. 1 which shows a plant for production of corrugated board fitted with an assembly of hot horizontal surfaces according to the invention.

With reference to the drawing cited, reference numeral 1 globally denotes the assembly of horizontal surfaces in a plant for production of corrugated board according to the invention.

The assembly of horizontal surfaces 1 is suitable for being used to join two or more sheets of paper material in a plant for production of corrugated board, that is in a plant not producing paper, but rather processing it so as to obtain a specific finished product suitable for putting on the market, such as for example a box, packaging or other similar product. In particular, the assembly of horizontal surfaces 1 is suitable to be used in a plant for production of corrugated board so as to join a second cover to one or more assemblies of sheets each of which formed of a cover 1*a* and of a corrugated sheet and which for simplicity's sake we will call corrugated paper pieces 1*b* or 1*d*.

In detail, as shown in FIG. 1, the assembly of horizontal surfaces 1 is suitable to be positioned between one or more gluing machines 11, 12 etc, each of which is suitable to deposit on the top of the flutes of a corrugated paper piece 1*b* a thin and even film of glue to permit the adhesion of the cover 1*a*, and the slitter-scorer cutting assembly, not shown in the drawing, suitable to cut the board coming out of the assembly of horizontal surfaces 1 respectively in a longitudinal direction and in a horizontal direction of advancement of the sheets in the production plant.

The assembly of horizontal surfaces 1 comprises at least one gluing station 10 suitable to carry out union between at least two sheets of paper material and a support structure 20 suitable to keep the various components of the gluing station 10 in the correct position. In particular, the gluing station 10 is suitable for joining two sheets to each other and, more specifically, a cover 1*a* to a corrugated paper piece 1*b* forming a single flute corrugated board.

Conversely, should production of a multi-flute corrugated board be desired, the assembly 1 does not have a single gluing station 10 suitable for joining several corrugated paper pieces 1*b* and a cover 1*a* to each other but rather, alternatively has a plurality of gluing stations 10.

Preferably, in this case the assembly of horizontal surfaces 1 has several gluing stations 10 in series, the first gluing station 10 of which is suitable for coupling a cover 1*a* to a corrugated paper piece 1*b* and the next coupling a new corrugated paper piece 1*d* to the product coming out of the station 10. Each gluing station 10 comprises two functionally separate blocks.

It thus has a preheating block 30 suitable to heat and join together at least two sheets, such as a cover 1*a* and a corrugated paper piece 1*b*; and a union block 40 suitable to complete union between the cover 1*a* and corrugated paper piece 1*b*.

The preheating block 30 comprises first heating means 31 suitable to heat at least one of the sheets to be joined and a first actuation system 32 suitable to move said sheets.

The first heating means 31 are suitable to come into direct contact with one of the two sheets and, preferably, with the cover 1*a*, so as to permit the heating of said cover and preferably, to heat both the cover 1*a* and the corrugated paper piece 1*b*.

Such first means 31 are composed for example of one or more known first heating plates 31*a* presenting a series of inner channels appropriately connected to a hot fluid supply system. For example said inner channels are suitable to have steam pass through them so as to heat the first heating plates 31*a*, and thus, heat both the cover 1*a* and the corrugated paper piece 1*b* and to bring them to a temperature substantially comprised between 80° C. and 200° C. and, preferably, comprised between 80° C. and 120° C.

On the side opposite the first heating means 31, in relation to the cover 1*a* and to the corrugated paper piece 1*b*, the preheating block 30 has a first actuation system 32 which is suitable to come into contact with one of the sheets and preferably with the corrugated paper piece 1*b* or 1*d*.

The first actuating system 32 comprises a first actuation belt 32*a* placed exclusively in correspondence with the preheating block 30, two or more actuation cylinders 32*b* suitable to permit the movement of the first belt 32*a* and a pressure apparatus which, acting on the first actuation belt 32*a* is suitable to ensure both the correct movement of the cover 1*a* and of the corrugated paper piece 1*b* and their reciprocal gluing.

The first actuation belt 32*a* is placed in correspondence with the first heating means 31 and consequently, is suitable to be moved solely in correspondence with such means 31.

To such purpose the first belt 32 is of length substantially double that of the extension of the first heating means 31 and, in addition, the first actuation system 32 has the outermost actuation cylinders 32*b* positioned substantially in correspondence with the beginning and the end of the preheating block 30.

The first actuation belt 32*a* is composed of sectors or of a single belt having at least one covering in felt or other material suitable for guaranteeing an adequate friction coefficient between the sheets in paper material and said first actuation belt 32*a*.

The correct gluing of the cover 1*a* and the corrugated paper piece 1*b* is ensured by the pressure apparatus which, exerting an appropriate force on the first actuation belt 32*a* determines a pressure which compresses the sheets in paper material between the actuation belt 32*a* and the heating means 31 and which then presses the corrugated paper piece 1*b* against the cover 1*a*.

The first pressure apparatus is therefore composed of one or more load elements 32*c* suitable to come into contact with the first actuation belt 32*a* and by a pressure mechanism, not shown in the drawing, composed for example of one or more pneumatic pistons suitable for exerting a suitable force on the aforesaid load elements 32*c* and thereby on the first belt 32*a*.

The union block 40 comprises second heating means 41 suitable to heat at least one of said sheets and a second actuating means 42 placed exclusively in correspondence with the second means 41 and suitable to move said sheets in correspondence with said second heating means 41.

The second heating means 41 are composed of second plates 41*a* substantially equivalent to the first heating plates 31*a*, but which are suitable to be heated and thus to bring the cover 1*a* and the corrugated paper piece 1*b* to a temperature substantially comprised between 80° C. and 200° C. and, preferably, comprised between 80° C. and 120° C.

The second actuating system 42 comprises a second continuous-actuation belt substantially analogous to the first movement system 32 and physically distinct from it. Alternatively, as shown in FIG. 1, it may be composed of one or more slide shoes 42*a* suitable for moving the assembly composed of the cover 1*a* and the corrugated paper piece 1*b*.

In particular, in order to ensure both the correct movement of the cover 1*a* and of the corrugated paper piece 1*b*, and their union, the second actuation system 42 may comprise a second pressure mechanism, substantially analogous to the first pressure apparatus 32*c*, suitable to press the slide shoes 42*a* against the corrugated paper piece 1*b*.

The union block 40 may lastly be fitted with a dispensing device suitable to dispense steam onto the sheets in paper material in correspondence with the second heating means 41.

Such dispenser device is composed of one or more nozzles 43, appropriately connected to a supply system, suitable to dispense a fluid, usually steam in correspondence with the second heating means 41.

The functioning of an assembly of horizontal surfaces in a plant for production of corrugated board, described above in a structural sense, is as follows.

In particular, the functioning is described with reference to a preferred example wherein the assembly of horizontal surfaces 1 is used in a plant for production of double flute corrugated board.

As shown in FIG. 1, the plant for production of corrugated board has, just before the assembly of hot horizontal surfaces 1, a gluing machine 11 which makes it possible to position the cover 1*a* substantially in contact with the first plates 31*a* of the first heating means 31 and the corrugated paper piece 1*b* practically adjacent to the first actuation belt 32*a*.

The pressure apparatus 32*c* thus begins to press on the first actuation belt 32*a*, pressing the cover 1*a* and the corrugated paper piece 1*b* together and moving them by means of the first actuation belt 32*a*.

Concurrently with the action of the first actuation system 32, the first heating means 31 begin to heat the cover 1*a* and the corrugated paper piece 1*b* so that as they transit through the preheating block 30 they are gradually brought to a temperature sufficient for gluing.

Once they have passed through the preheating block 30, the cover 1*a* and the corrugated paper piece 1*b* leave the preheating block 30 and then enter the union block 40.

At this point, the cover 1*a* and the corrugated paper piece 1*b* are no longer moved by the first actuation system 32 but instead by the second actuation system 42 which consequently guides the cover 1*a* and the corrugated paper piece 1*b* as they pass through the union block 40.

During such transit, in order to maintain adequate conditions for the union of the cover 1*a* and the corrugated paper piece 1*b* to form a compound sheet 1*c*, the second heating means 41 and the dispensing device substantially supply the adequate temperature and humidity values to the cover 1*a* and the corrugated paper piece 1*b*.

Once the compound sheet 1*c* has crossed the union block 40, the union of the cover 1*a* and the corrugated paper piece 1*b* is completed.

In detail, at the output of the first gluing station 10, the cover 1*a* and the corrugated paper piece 1*b*, thanks to the heating undergone during transit through the first station 10, are substantially at a temperature of 60° C. to 90° C. so as to facilitate the gluing of a second corrugated paper piece 1*d*.

At this point, as shown in FIG. 1, the plant for production of corrugated board has a second gluing machine 12 which places the second corrugated paper piece 1*d* on the first corrugated paper piece 1*b* of the compound sheet 1*c* in correspondence with the end of the first gluing station 10 and, more specifically, between the union block 40 of the first gluing station 10 and the preheating block 30 of the second gluing station 10.

The assembly composed of a compound sheet 1*c* and a second corrugated paper piece 1*d* then enters the second gluing station 10 which performs, in an analogous manner to the gluing described above, the union of the first corrugated paper piece 1*b* and the second corrugated paper piece 1*d*.

In each station consequently, a corrugated paper piece 1*d* is coupled to a compound sheet 1*c* which, in the case of the first station is composed of the cover 1*a* only and in the case of the subsequent stations is composed of the cover 1*a* coupled to as many corrugated paper pieces 1*b* as the number of prior gluing stations 10.

The invention achieves some important advantages.

A first important advantage lies in the fact that the assembly of horizontal surfaces 1 makes it possible to perform adequate gluing of sheets of paper material thanks to the possibility of performing each of the steps of the gluing process between a cover 1*a* and a corrugated paper piece 1*b* in practically optimal conditions.

Such advantage is advantageously and innovatively achieved by dividing the assembly of horizontal surfaces 1 over several separate stations 10 which are, in turn, structurally and functionally divided into two blocks 30 and 40 suitable for not interfering with each other.

In particular, such particular working condition is achieved by providing each block 30, 40 with its own apparatuses and therefore by not having mechanisms which given their use by both blocks, could modify the working conditions thereof. More in particular, such condition is achieved by providing each block 30, 40, conversely to the known assemblies of horizontal surfaces, with its own actuation system 32 and 42.

The presence of two actuation systems 32 and 42 in fact makes it possible for the first actuation belt 32*a* to be suitable to move the cover 1*a* and the corrugated paper piece 1*b* solely in correspondence with the first heating means 31.

Such condition makes it possible to prevent it from being influenced by the second heating means 41 and by the dispenser device and thus from modifying its temperature and humidity on account of the different working conditions present in the preheating block 30 and in the union block 40.

Another advantage, connected to the fact of having several union stations in series, is the possibility of making a multi-flute corrugated board through a succession of gluing steps each of which suitable to glue a single corrugated paper piece 1*b*. The possibility of gluing a single corrugated paper piece 1*b* at a time, makes it possible to avoid heating the cover 1*a* excessively, and thus, its deterioration.

Such advantage is related to the fact that, unlike as happens in the known assemblies of horizontal surfaces 1, the assembly of horizontal surfaces 1 is able to heat the first corrugated paper piece 1*b* as it passes through the entire first gluing station 10 and the second pre-heating block 30.

To conclude, to adequately heat the gluing surface of the corrugated paper piece 1*b*, the assembly of horizontal surfaces 1 has a much greater portion and therefore longer time available than that available to the known assemblies of horizontal surfaces.

Another important advantage, related to the advantageous working conditions present in the two blocks 30 and 40, is the absence of bubble forming phenomena, warping or other similar phenomena which would degrade the sheets in paper material and thereby determine a poor quality final product, causing problems to the production process.

A further advantage is therefore the possibility of having improved quality production characterised by fewer discards.

Modifications and variations may be made to the invention described herein without departing from the scope of the inventive concept. For example as mentioned, it is possible to avail of a single station 10 provided with several separate actuation systems 32 and 42 for board with several layers of corrugated paper 1*b*. The main advantages are therefore in any case achieved.

It is, furthermore, possible to subdivide the union block 40 in turn into further separate actuation systems. All the elements as described and claimed herein may be replaced with equivalent elements and the scope of the invention includes all other details, materials, shapes and dimensions.

The invention claimed is:

1. An assembly of horizontal surfaces (1) in a plant for production of corrugated board that produces a corrugated board (1*d*) by bringing together and gluing at least one corrugated sheet (1*b*) and one cover sheet (1*a*) both advancing along a predetermined direction, the assembly comprising:

at least one gluing machine (11), adapted to deposit a film of glue on the at least one corrugated sheet (1*b*), and at least two heating blocks (30, 40), both disposed downstream to the gluing machine (11) along the predetermined advancing direction of the cover sheet and at least one corrugated sheet (1*a*, 1*b*), each heating block comprising at least one heating plate (31*a*, 41*a*), configured to come into contact with and to heat the cover sheet (1*a*), and an actuating system comprising an actuation belt (32*a*) facing the at least one heating plate (31*a*, 41*a*), configured to move the cover sheet and at least one corrugated sheet (1*a*, 1*b*) of paper material along the predetermined advancing direction and configured to come into contact with said at least one corrugated sheet (1*b*).

2. The assembly of horizontal surfaces (1) as claimed in claim 1, further comprising a second gluing machine (12)

disposed downstream of the heating block (40) along the advancing direction of the cover sheet and at least one corrugated sheet (1*a*, 1*b*) and is adapted to deposit a film of glue on a further corrugated sheet (1*d*).

3. The assembly of horizontal surfaces (1) as claimed in claim 2, further comprising a plurality of further heating blocks (40) disposed downstream of the second gluing machine (12) along the advancing direction of the cover sheet and at least one corrugated sheet (1*a*, 1*b*).

4. The assembly of horizontal surfaces (1) as claimed in claim 1, wherein said actuating system (32, 42) comprises a pressure apparatus (32*c*, 42*a*) for pressing said actuation belt (32*a*) so as to compress said cover sheet and at least one corrugated sheet (1*a*, 1*b*) between said actuation belt (32*a*) and said heating plates (31*a*, 41*a*).

5. The assembly of horizontal surfaces (1) as claimed in claim 1, wherein at least one of the heating blocks (40) comprises a steam dispensing device (43) configured to dispense steam at said corrugated sheet (1*b*).

6. The assembly of horizontal surfaces (1) as claimed in claim 1, wherein said gluing station (10) is configured to join the cover sheet (1*a*) and the at least one corrugated sheet (1*b*) thereby forming a compound sheet (1*c*).

7. An assembly of horizontal surfaces (1) in a plant for production of corrugated board that produces a corrugated board (1*d*) by bringing together and gluing at least one corrugated sheet (1*b*) and one cover sheet (1*a*) both advancing along a predetermined direction, the assembly comprising:

at least one gluing machine (11), adapted to deposit a film of glue on the at least one corrugated sheet (1*b*), a preheating block (30), disposed downstream to the gluing machine (11) along the predetermined advancing direction of the cover sheet and at least one corrugated sheet (1*a*, 1*b*), comprising at least one heating plate (31*a*), configured to come into contact with and for heating the cover sheet (1*a*), a first actuating system comprising an actuation belt (32*a*) facing the at least one heating plate (31*a*), configured to move the cover sheet and at least one corrugated sheet (1*a*, 1*b*) of paper material along the predetermined advancing direction and to come into contact with said at least one corrugated sheet (1*b*) and a further heating block (40), disposed downstream of the preheating block (30) along the predetermined direction of the cover sheet and at least one corrugated sheet (1*a*, 1*b*), and comprising at least one further heating plate (41*a*), configured to come into contact with and to heat the cover sheet (1*a*), and a second actuating system (42) comprising at least one slide shoes (42*a*) facing the at least one further heating plate (41*a*), physically distinct from the first actuating system (32) and configured to move the cover sheet and at least one corrugated sheet (1*a*, 1*b*) of paper material along the predetermined advancing direction and configured to come into contact with said corrugated sheet (1*b*).

8. The assembly of horizontal surfaces (1) as claimed in claim 7, further comprising at least a second gluing machine (12) disposed downstream of the further heating block (40) along the advancing direction of the cover sheet and at least one corrugated sheet (1*a*, 1*b*) and adapted to deposit a film of glue on a further corrugated sheet (1*d*).

9. The assembly of horizontal surfaces (1) as claimed in claim 8, further comprising a plurality of further pre-heating (30) and heating blocks (40) disposed downstream of the second gluing machine (12) along the advancing direction of the cover sheet and at least one corrugated sheet (1*a*, 1*b*).

* * * * *